(12) United States Patent
Diceman

(10) Patent No.: US 10,467,637 B2
(45) Date of Patent: Nov. 5, 2019

(54) FEEDBACK COLLECTION SYSTEM AND METHOD

(71) Applicant: Jason Diceman, Toronto (CA)

(72) Inventor: Jason Diceman, Toronto (CA)

( * ) Notice: Subject to any disclaimer, the term of this patent is extended or adjusted under 35 U.S.C. 154(b) by 0 days.

(21) Appl. No.: 15/740,079

(22) PCT Filed: Jun. 28, 2016

(86) PCT No.: PCT/CA2016/050759
§ 371 (c)(1),
(2) Date: Dec. 27, 2017

(87) PCT Pub. No.: WO2017/000067
PCT Pub. Date: Jan. 5, 2017

(65) Prior Publication Data
US 2018/0189804 A1    Jul. 5, 2018

Related U.S. Application Data

(60) Provisional application No. 62/185,797, filed on Jun. 29, 2015.

(51) Int. Cl.
*G06Q 30/02* (2012.01)
*G06F 1/16* (2006.01)

(52) U.S. Cl.
CPC ............ *G06Q 30/0201* (2013.01); *G06F 1/16* (2013.01); *G06F 1/1607* (2013.01); *G06F 1/1637* (2013.01)

(58) Field of Classification Search
CPC .......... G07C 13/02; G07D 9/002; A45C 1/12; A45C 2001/107; A47G 1/12; G06Q 30/0201; G06Q 10/00; G06Q 30/02; G06F 1/16; G06F 1/1607; G06F 1/1637

USPC ..... 232/2, 4 R, 5, 1 D; 206/0.8, 0.81, 0.815, 206/0.84; 705/7.29; 446/8
See application file for complete search history.

(56) References Cited

U.S. PATENT DOCUMENTS

| | | | | |
|---|---|---|---|---|
| 1,499,113 | A * | 6/1924 | McNally | A45C 1/12 206/0.815 |
| 2,777,633 | A * | 1/1957 | Phillips | G07C 13/02 232/2 |
| 3,085,378 | A * | 4/1963 | Howard | G07D 9/065 206/0.8 |
| 3,113,711 | A * | 12/1963 | Janus | A45C 1/12 206/0.815 |
| 5,409,106 | A * | 4/1995 | Okuda | A47G 1/12 206/8 |
| 5,884,755 | A * | 3/1999 | Vaccarella | A47G 1/12 206/0.84 |
| 5,988,365 | A * | 11/1999 | McAdams | A47G 1/12 206/0.83 |
| 6,604,626 | B1 * | 8/2003 | Hanshaw | A47G 1/12 206/0.81 |

(Continued)

*Primary Examiner* — William L Miller
(74) *Attorney, Agent, or Firm* — Heer Law; Christopher D. Heer

(57) ABSTRACT

In accordance with the present invention, there is provided a feedback collection system, method and kit that allows for feedback to be collected from a group of people about an evaluand in a manner where an individual person's feedback may not be attributable to that individual and will not be influenced by the already submitted feedback of others, and also may permit the group's feedback to be quickly and easily summarized and tabulated in a visual graph-like manner.

25 Claims, 8 Drawing Sheets

(56) References Cited

U.S. PATENT DOCUMENTS

| | | | |
|---|---|---|---|
| 9,965,066 B2* | 5/2018 | Zhang | G06F 3/0202 |
| 2004/0031700 A1* | 2/2004 | Hanshaw | A47G 1/12 |
| | | | 206/0.84 |
| 2004/0094434 A1* | 5/2004 | Ahmed | A45C 1/10 |
| | | | 206/0.83 |
| 2004/0124099 A1* | 7/2004 | Fields | A45C 1/02 |
| | | | 206/0.815 |
| 2010/0116692 A1* | 5/2010 | DePuydt | A45C 1/12 |
| | | | 206/0.81 |

* cited by examiner

FEEDBACK COLLECTION SYSTEM AND METHOD

FIELD OF THE INVENTION

The present specification relates generally to feedback collection and more specifically relates to a feedback collection system and method to better allow for the collection of opinions about something in a quantitative manner from a group of people at a meeting or outside of a meeting.

BACKGROUND OF THE INVENTION

Various problems may be encountered in collecting opinions from a group of people. When a group of people are physically situated in the same room and oral feedback is solicited, some people in the group will be ready to voice their opinions but most people feel uncomfortable voicing their opinions in front of the group since giving feedback in these circumstances is not anonymous. Moreover, the opinions given by prior feedback-givers may influence subsequent feedback-givers, especially if the prior feedback-givers are influential in character or rank. Verbal expression of opinions can also lead to debates and arguments without constructive results.

Furthermore, when oral or written feedback is solicited, the feedback given is often qualitative and may be difficult to classify or categorize quickly or even at all. Even if feedback is collected by, for example, written answers to multiple choice questions, time must be taken to review each individual feedback submission in order to tabulate totals for the group and then be able to share the result.

It would be desirable to be able to collect feedback from a group of people without individual responses being influenced by prior responses and in way that allows the feedback to be collected and tabulated quickly so that results can be shared immediately in an easy to understand visual manner. Accordingly, there remains a need for improvements in the art.

SUMMARY OF THE INVENTION

Embodiments of the invention may be used individually or in sets up to any quantity. They may be used in a meeting or outside of a meeting over an extended period of time. Embodiments of the invention may be used to provide feedback on any form of subject that may be evaluated, which is referred to as the evaluand, by an individual's observation, experience and/or opinion, including, but not limited to:
  a statement;
  visual content (e.g. photo, illustration, graphic, painting);
  an object (e.g. tool, sculpture, furniture, toy, appliance);
  sound (e.g. audible recording);
  something that can be tasted (e.g. food or drink);
  a scent (e.g. perfume); or
  a performance (e.g. dance, drama, spoken word, musical).

In accordance with an aspect of the invention, there is provided a feedback collection system and method that allows for feedback to be collected from a group of people about an evaluand in a manner where an individual person's feedback may not be attributable to that individual and will not be influenced by the already submitted feedback of others, and also may permit the group's feedback to be quickly and easily summarized and tabulated in a visual graph-like manner.

According to an embodiment of the invention, the present invention provides a feedback collection system for collecting feedback from a group of people, the system comprising: a response collector including a display portion, the display portion having a visible surface displaying two or more selections for user responses and a token collection portion, the token collection portion have two or more receptacles dimensioned to receive tokens, each token then stored in the receptacle in a substantially vertical position and positioned such that each receptacle is associated with one of the selections, the token collection portion being at least partially translucent such that all the tokens are equally visible within the token collection portion; a removable screen removably attached to one of the display portion and the token collection portion such that when attached the removable screen substantially conceals the token collection portion from view of the group of people; a securing mechanism for removably attaching the removable screen to the response collector; and two or more tokens.

According to a further embodiment, the present invention provides a method for collecting feedback from a group of people, the method comprising: providing a first medium indicating an evaluand about which feedback from the group of people is being collected; providing a feedback collection device, the feedback device comprising: a response collector including a display portion, the display portion having a visible surface displaying two or more selections for user responses and a token collection portion, the token collection portion have two or more receptacles dimensioned to receive tokens, each token then stored in the receptacle in a substantially vertical position and positioned such that each receptacle is associated with one of the selections, the token collection portion being at least partially translucent such that the tokens are visible within the token collection portion; a removable screen removably attached to one of the display portion and the token collection portion such that when attached the removable screen substantially conceals the token collection portion from view of the group of people; and a securing mechanism for removably attaching the removable screen to the response collector; providing two or more tokens to the group of people; and receiving, from two or more people from the group of people a token into the token collection portion of the response collector in a manner associating the token with that person's rating of the evaluand.

According to a further embodiment, the present invention provides a kit for assembling a feedback collection system, the kit comprising: one or more first mediums for indicating an evaluand about which feedback from a group of people is being collected; a response collector including a display portion, the display portion having a visible surface displaying two or more selections for user responses and a token collection portion, the token collection portion have two or more receptacles dimensioned to receive tokens, each token then stored in the receptacle in a substantially vertical position and positioned such that each receptacle is associated with one of the selections, the token collection portion being at least partially translucent such that the tokens are visible within the token collection portion; one or more second mediums for application to the display portion and providing variations for the two or more selections for user responses; a removable screen removably attached to one of the display portion and the token collection portion such that when attached the removable screen substantially conceals the token collection portion from view of the group of people; a securing mechanism for removably attaching the removable screen to the response collector; an adjustable stand for supporting the response collector in an inclined or vertical position; and two or more tokens for use by the group of people.

Other aspects and features according to the present application will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example only, embodiments of the invention, and how they may be carried into effect, and in which.

Like reference numerals indicate like or corresponding elements in the drawings.

DETAILED DESCRIPTION OF THE EMBODIMENTS

Figure 5:
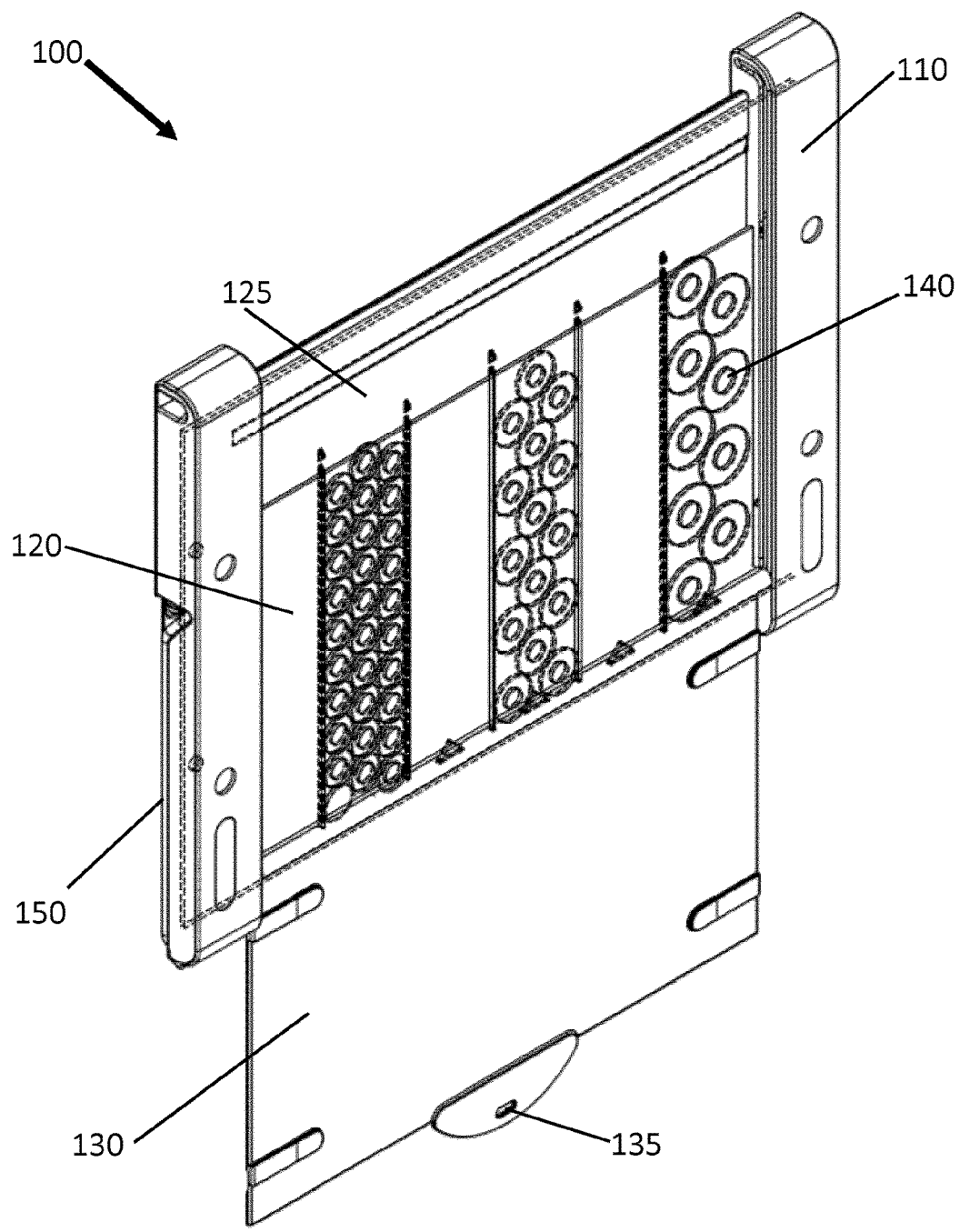
FIG. 5 shows a front left perspective view of a feedback device in an open position containing tokens according to another one of the embodiments.
Figure 6:
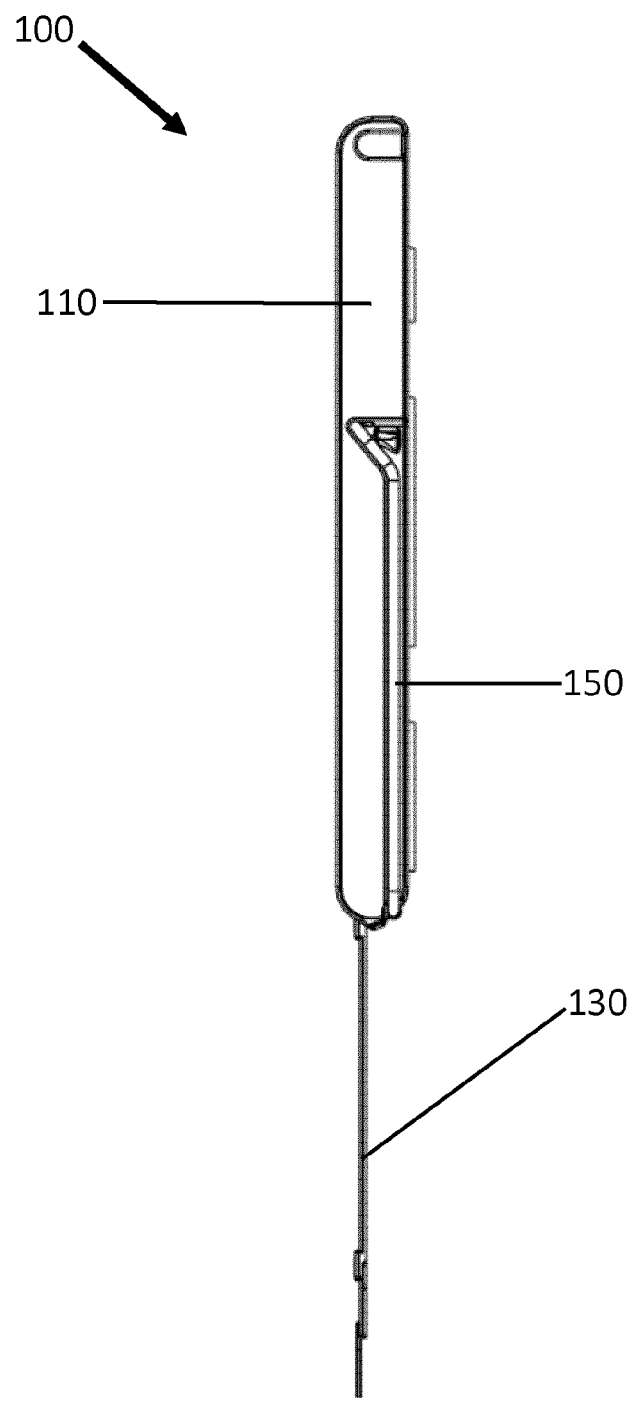
FIG. 6 shows a right side view of the feedback device of FIG. 5 in an open position.

According to an embodiment as shown in FIGS. 1 to 4, a feedback collection device 100 is shown to allow for the collection of feedback or opinions about an evaluand (i.e. something that is being evaluated), for example an idea, which may be expressed in the form of a written statement, from a group of people such as participants in a meeting. The feedback collection device 100 may comprise a frame 110, an internal set of receptacles 120, and front cover 130. The receptacles, six in the embodiment shown, are designed to collect tokens 140. In operation, each participant places a token 140 into a receptacle 120 which corresponds to their feedback on the evaluand. The tokens 140 are then stored in the receptacle 120 in a substantially vertical position. A stand 150 may be pivotally secured to the frame 110 to enable the frame 110 to stand upright and permit access to the receptacles 120. Alternatively, as shown in FIGS. 5 and 6, the device 100 may be hung vertically by the frame 110 or laid flat on a table or similar surface. If desired, the device 100 may be held or carried by hand.

Figure 2:
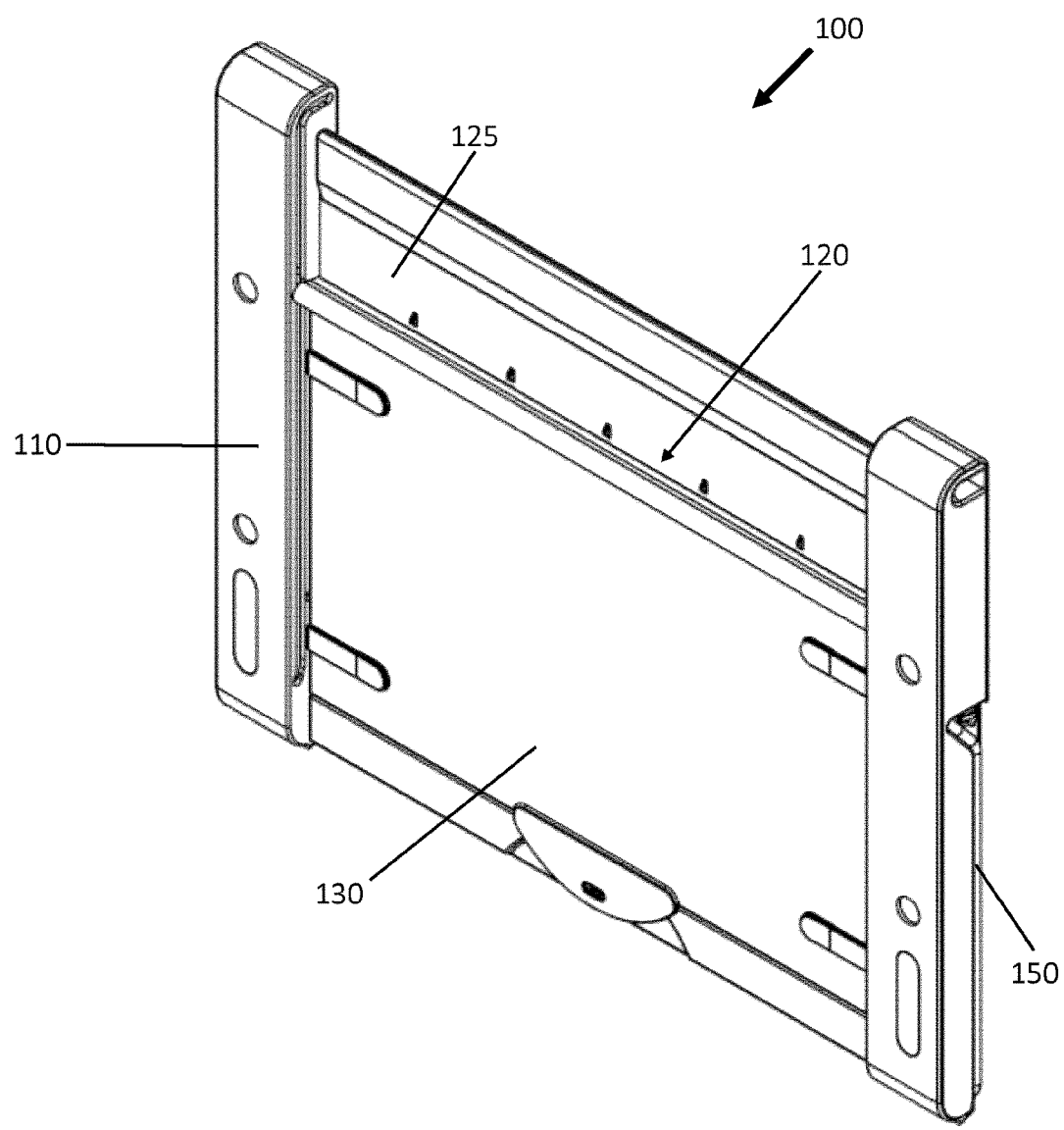
FIG. 2 shows a front right perspective view of the feedback device of FIG. 1 in a closed position.
Figure 3:
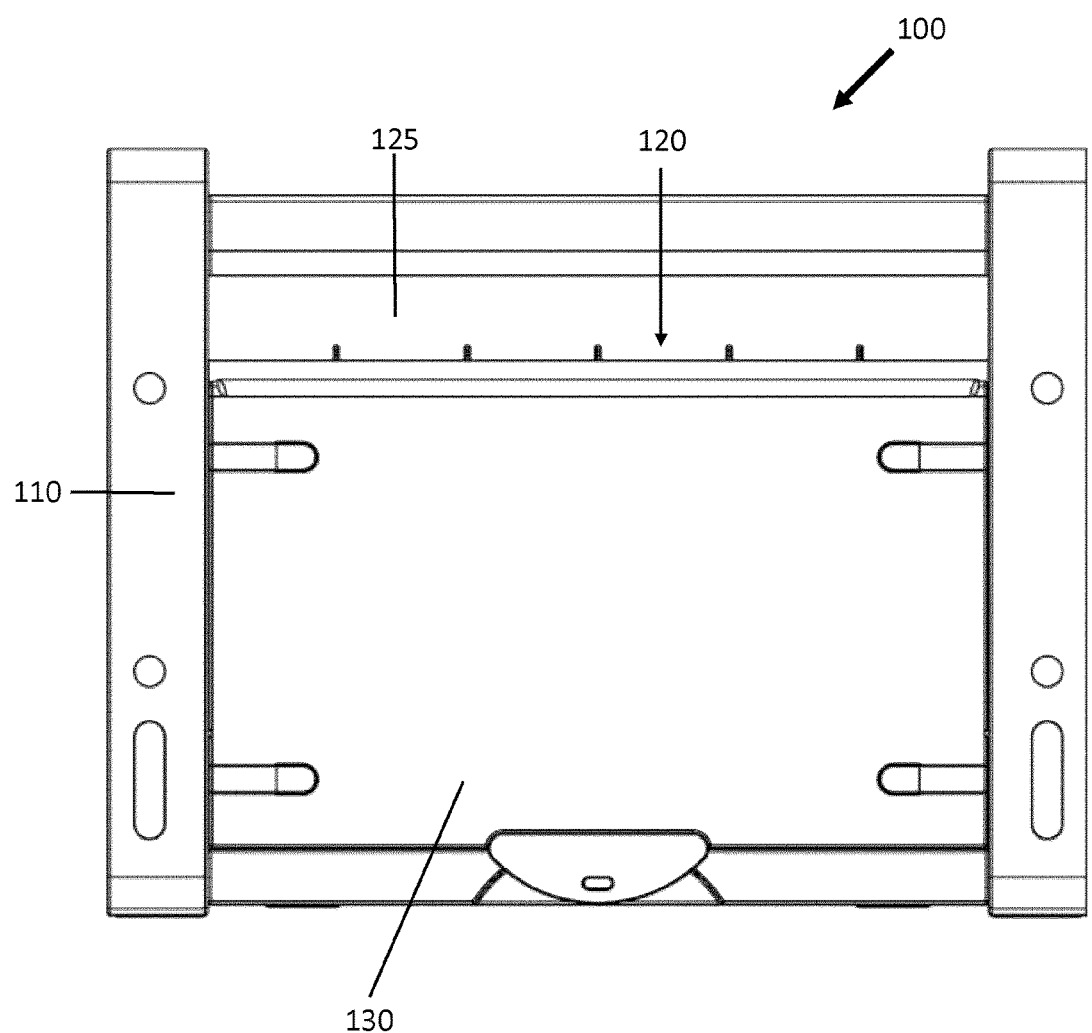
FIG. 3 shows a front view of the feedback device of FIG. 1.
Figure 4:
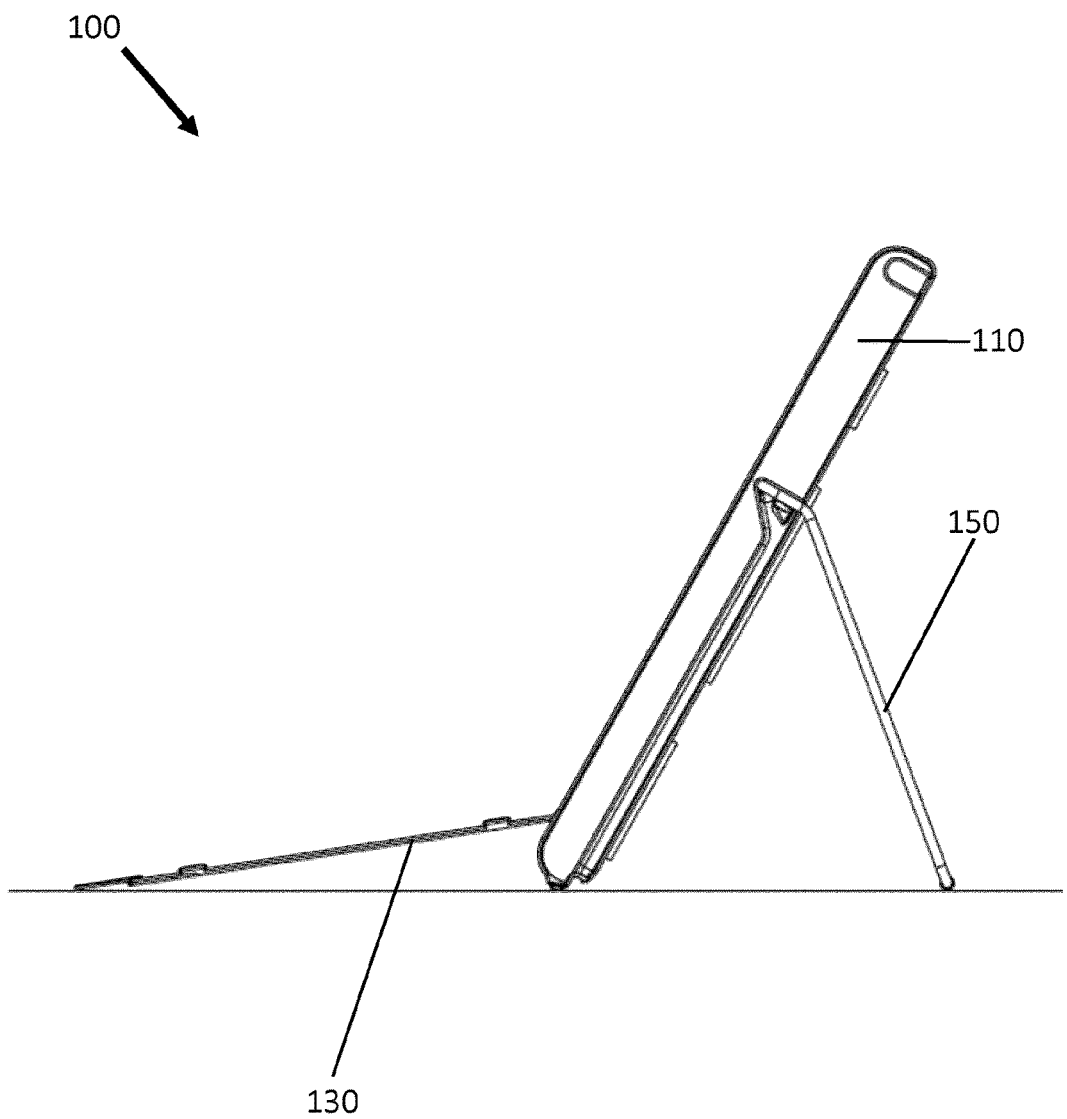
FIG. 4 shows a right side view of the feedback device of FIG. 1 in an open position.

Preferably, receptacles 120 are at least partially translucent on at least one side such that tokens 140 are readily visible therein for tabulation purposes. Alternatively, receptacles 120 may be fully transparent or windowed. Further, the device may include a display portion 125 above receptacles 120 to indicate the correspondence between receptacles 120 and the desired feedback. Front cover 130 is dimensioned such that, when the device 100 is closed as shown in FIG. 2, front cover 130 conceals receptacles 120 to a degree that any tokens 140 therein are not visible. However, display portion 125 may remain visible to assist users with depositing tokens in the correct receptacles. Additionally, receptacles 120 may be marked with graduation marks or lines to assist in the tabulation of the tokens 140 therein. Optionally, a hole 135 may be provided in front cover 130 to more effectively secure it to frame 110 via a lock, zip tie, string, etc.

Thus, as each participant places their token 140 into the system 100, their feedback is presumably not influenced by any prior feedback, as previously inserted tokens 140 are not visible. Alternatively, receptacles 120 may be translucent on the rear-facing side, eliminating any need for front cover 130. Additionally, receptacles 120 may be covered by a latch or spring-loaded mechanism or equivalent which prevents the tokens 140 from escaping the receptacles if the device 100 is accidently shaken or knocked over.

To instruct and assist participants, instructions may be presented on any or all of front cover 130, display portion 125, receptacles 120, frame 110 and tokens 140. Instructions may include: a description of the evaluand, the designations of the receptacles and their correspondence to feedback, and description and designation for the tokens (if applicable).

For example, an instruction medium (e.g. a sheet of paper, laminate, etc.) containing a description of the evaluand may be removably secured to front cover 130 by, for example, spring clips, such that the medium is clearly visible to the participants. Additionally, a feedback rating sheet, such as rating from 1-5, plus a null response, corresponding to six receptacles, may be removably secured to display portion 125, either restricted solely to the visible section, or extending into receptacles 120, to assist in visual comparison of the token counts. Alternatively, the surfaces of front cover 130 and display portion 125 may be made of a material, such as a dry-erase surface, whiteboard or chalkboard, and information inscribed directly thereon. Preferably, one or more of front cover 130, display portion 125, receptacles 120, and the combination of display portion 125 and receptacles 120 are dimensioned to standard paper sizes, such as letter (8½"×11"), legal (8½"×14") or A4.

Furthermore, the instruction sheet may include regions for comments to be written about the evaluand, and may also allow people to sign the sheet to confirm receipt/deposit of tokens without attributing their individual feedback back to them. Various other layouts of instruction sheets are also possible.

For example, the instructions may say, "1. Read statement below", "2. Drop one token to record your opinion above" and "3. Sign below on the right" with an "Optional: add comments". Additionally, the instructions may be enclosed by bubbles or boxes and positioned beside arrows directed to the object of the instruction in order to assist the person who wishes to provide feedback use the feedback collection device 100.

The desired feedback may take many forms: numerical ratings (e.g. 1-5), color coding (e.g. red/yellow/green), emoji (e.g. happy/neutral/sad) or alternative selections, such as price choices for a product, or food choices for an event.

Some examples of feedback displays are presented in the table below:

| Feedback Type | Evaluand Question | Feedback responses |
| --- | --- | --- |
| Agreement with a Statement | Do you agree? | Strong Agreement Agreement Neutral |

-continued

| Feedback Type | Evaluand Question | Feedback responses |
|---|---|---|
| Importance of a Question | Is this an important question? | Disagreement<br>Strong Disagreement<br>Very Important<br>Important<br>Neutral<br>Not Important<br>Really Not Important |
| How Good an Answer Is (to a question) | Is this a good answer? | Very Good Answer<br>OK Answer<br>Neutral<br>Not a Good Answer<br>Bad Answer |
| Like | Do you like this? | Love it<br>Like it<br>It's OK<br>Not Really<br>Hate It |
| Risk Assessment | How risky would this action be? | Very Risky<br>Risky<br>Neutral<br>Pretty Safe<br>Very Safe |
| Priority/Importance | How important is this? | Very Important<br>Important<br>Neutral<br>Unimportant<br>Very Unimportant |
| Challenge | How much of a challenge is this? | Big Challenge<br>Medium Challenge<br>Small Challenge<br>Easy<br>Very Easy |
| High Quality | What is the quality of this item? | Very High Quality<br>High Quality<br>Average Quality<br>Low Quality<br>Very Low Quality |
| Interesting | Is this an interesting idea? | Very Interesting<br>Interesting<br>OK<br>A Little Boring<br>Very Boring |
| Recommendation | Would you recommend this? | Big Recommendation<br>Medium Recommendation<br>Small Recommendation<br>No Recommendation<br>Recommend Against |

Additionally, the feedback scope may be expanded through using of combination of feedback devices 100. For example, a larger range of feedback options may be provided by adjoining two or more devices adjacent or in proximity to each other. For example, four modular response collectors may be placed side-by-side to provide a 24-point scale of numbers on a price range for asking test consumers what price they would pay for an item. Or, as another example, taking a proposed product as the evaluand, one device could collect feedback on ease-of-use, another on desirability, and still another on pricing options. As an alternative, the display portion 125 may divide the receptacles 120 into two or more groups, to collect multiple types of feedback on a single evaluand. For example, the display portion 125 may divide a set of six receptacles 120 into two sets of three receptacles each, e.g. Fast, Medium, Slow in one half and Difficult, Medium, Easy in a second half. In this embodiment, the participants may drop two tokens into the feedback collection device 100 so that they may provide both types of feedback on the evaluand.

Figure 8:
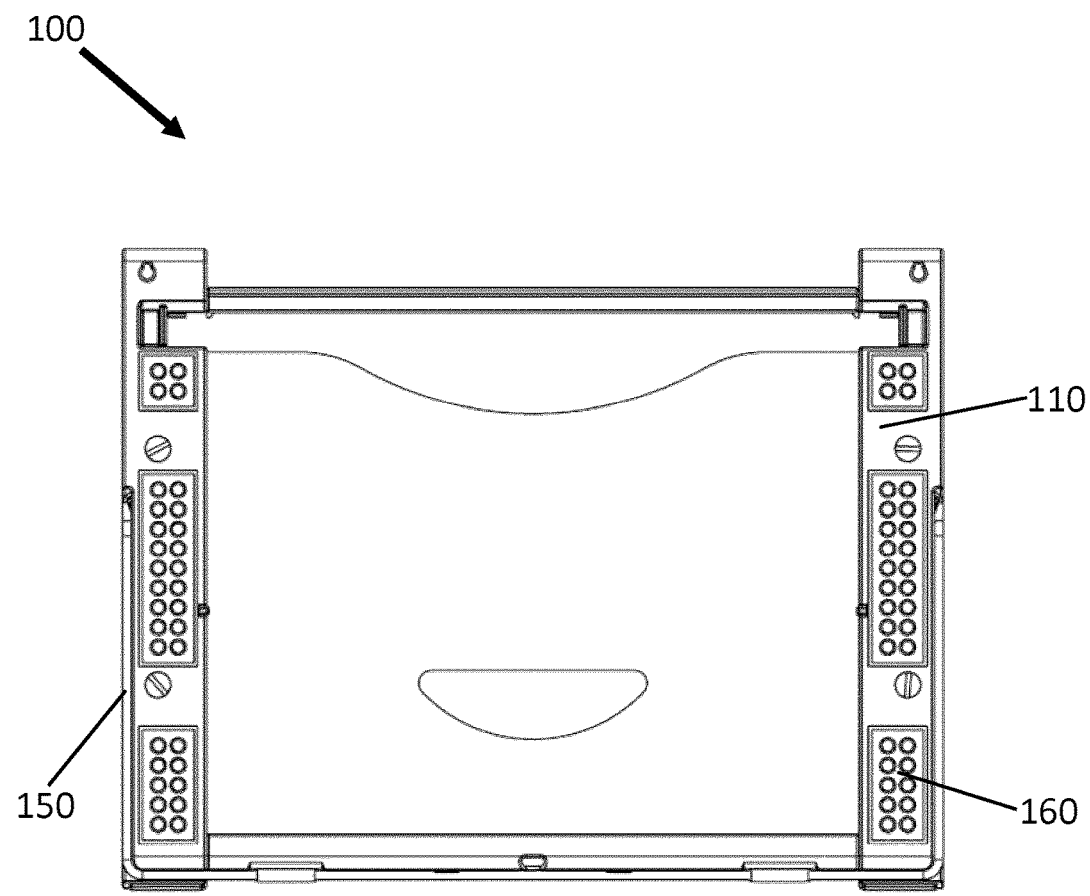
FIG. 8 shows a rear view of the feedback device of FIG. 1.

To assist in joining multiple devices together, the back side of the frame 110 as shown in FIG. 8 may be provided with one or more universal connector elements 160, such as Velcro™, Lego™, or magnets, that would permit joining devices via the universal connector element 160. Additionally, universal connector element 160 may be used to attach elements to assist in the feedback process, such as a pen holder, clipboard, token dispenser, etc. Optionally, one or more universal connector elements 160 may be disposed on the sides or front of frame 110, or on front cover 130.

Tokens 140, which according to an embodiment may be an object that is substantially flat, substantially circular, and sufficiently heavy to fall by gravitational force, for example, an object comprising a material such as metal or plastic and is capable of being inserted and stored in the receptacle 120 in a substantially vertical position, as opposed to a planar position. Alternatively, washers and/or coins may be suitable for use as tokens 140 if no tokens are available specifically for use with the feedback collection device 100. Tokens 140 may be all substantially identical, emphasizing the anonymous nature of the feedback. Alternatively, non-identical tokens may used, including tokens of different colors or sizes, which may be used to designate persons as coming from particular subgroups of the group of people submitting feedback, for example, blue tokens for men and red tokens for women. According to further embodiments, other shapes of token may be used including tokens that are oval, polygon or irregular shapes. Further, tokens 140 may be substantially flat or in the form of a sphere, cylinder, rectangular prism or other three-dimensional form as long as the token 140 may still be received within the receptacle 120 as described.

Figure 1:
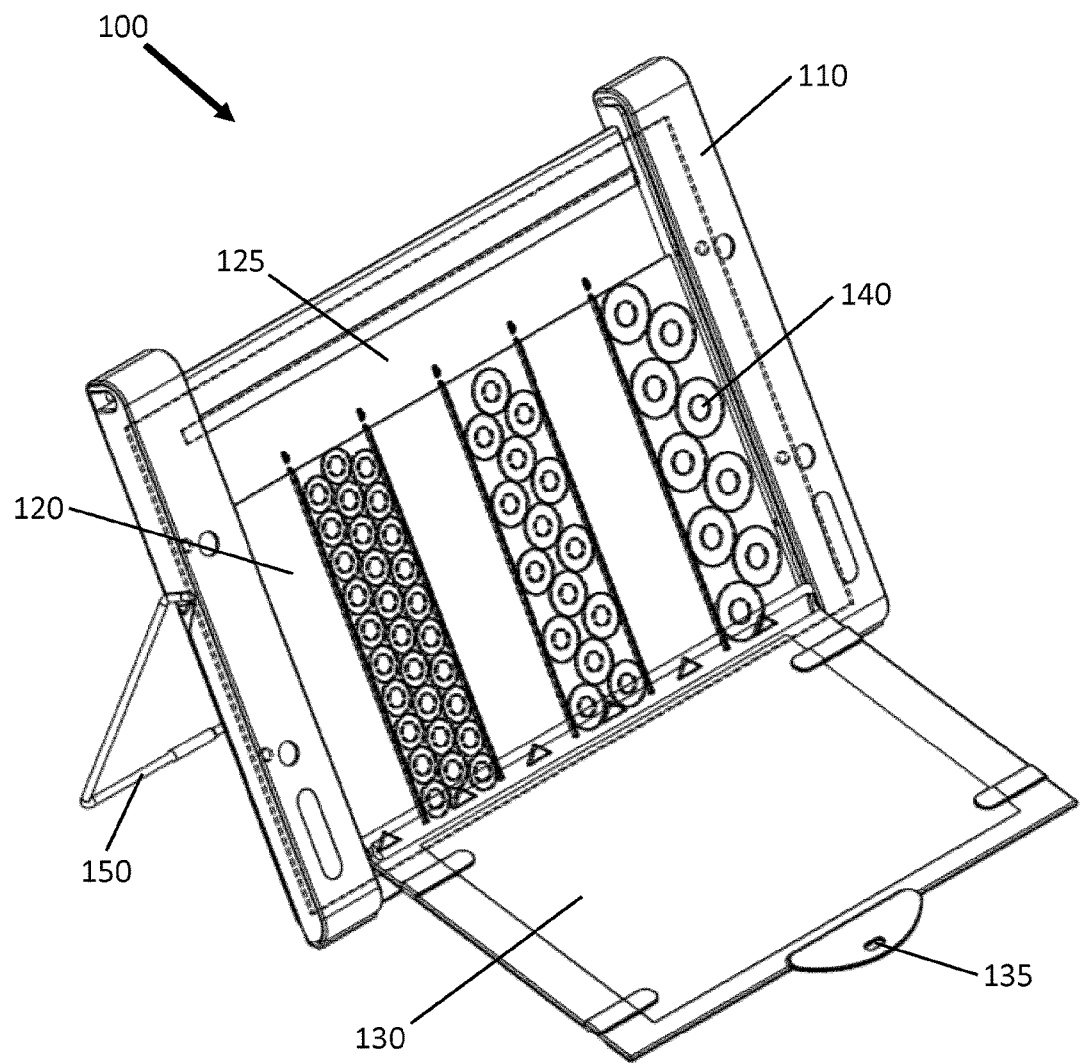
FIG. 1 shows a front left perspective view of a feedback device in an open position containing tokens according to one of the embodiments.

In operation, a single token 140 may be distributed to each person to avoid the same person depositing multiple tokens 140. A token 140 may be received in the receptacle 120 of the feedback device 100, with each receptacle 120 (six, as shown in FIG. 1) corresponding to a specific feedback response. Tokens 140 may stack within the receptacle 120 such that all are visible so as to better enable a tally of the number of people selecting that item to be made by counting the number of tokens 140 in each receptacle 120. Furthermore, through the use of graduation markers or lines, it may be possible to more quickly count the number of tokens 140 in a receptacle 120, especially where uniformly sized tokens are used which allow only a specific number of tokens to be stored below a particular graduation marker.

In use, the feedback collection device 100 as shown in FIGS. 1-4 may be used to collect feedback in a process which individual persons from a group of people review the evaluand on the instruction sheet, and then place a token 140 in a particular receptacle 120 corresponding to the display portion 120 that reflects their rating of the evaluand on the instruction sheet. According to an embodiment, the person may also sign the instruction sheet and optionally provide written comments about the evaluand. Even if the person signs the instruction sheet, as long as multiple people submit feedback, individual feedback may not be readily attributable to a particular individual. According to an embodiment, each feedback collection device 100 and possibly each instruction sheet may be given a unique identification number to help with organizing and referencing the results.

Since each person has an equal opportunity to provide feedback and each person may participate silently, the participation rate of people in the group may be increased where submitting feedback is optional or voluntary. Moreover, since individuals cannot see the tokens 140 deposited by others at the time of giving their feedback, the feedback collection device 100 may be better able to accurately capture the varying opinions in a large group. Furthermore, judgments about the evaluand are made about the statements as they are written, not on the person who created them, or how they were spoken.

Figure 7:
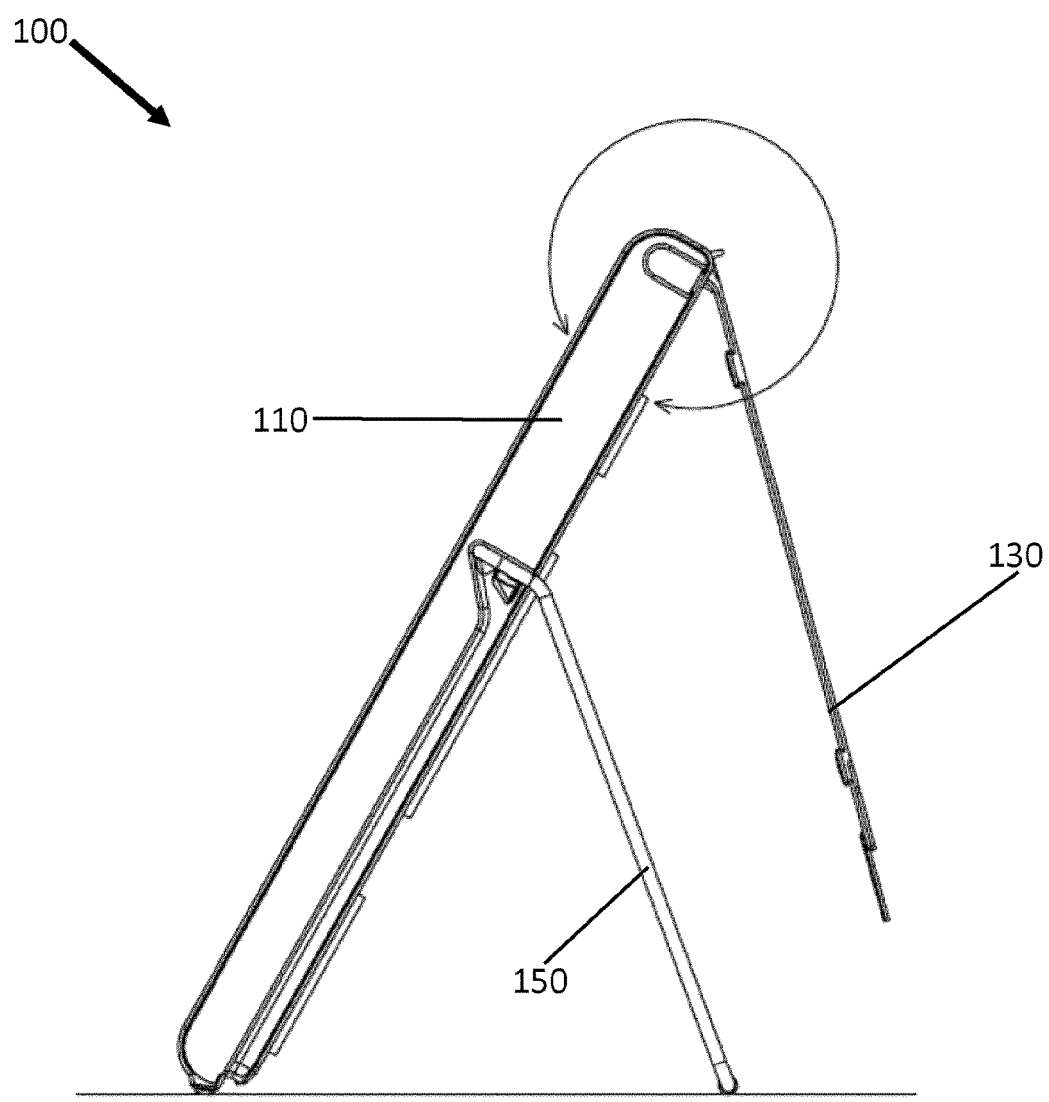
FIG. 7 shows a right side view of a feedback device in an open position.

Once feedback collection is complete, the front cover 130 may be removed or flipped over the frame 110 (as shown in FIG. 7) and the results of feedback collection may be visually seen by the group. The tokens 140 may be easily counted to arrive at totals, with or without the aid of graduation markers or lines. It may then be seen which evaluand had the most agreement and which had the most conflict.

According to most embodiments, the feedback collection device 100 may be inexpensively made, and does not require a computer, software, a battery, or electrical power. The rating scheme may be readily changed through modification of the display portion 125, as well as modifying the displayed instructions, particularly where display portion 125 and front cover 130 are re-writeable surfaces.

Setup of the feedback collection system 100 is relatively quick and as such feedback may be collected for both evaluands such as ideas generated before a meeting that are pre-populated into instruction sheets as well as evaluands such as ideas generated during a meeting by providing instruction sheets at the meeting. Participants may then write down a new evaluand, for example, an idea, on one of the blank instruction sheets and then feedback may be collected from the group of people using the feedback collection device 100 according to the methods disclosed herein. According to an embodiment, multiple feedback collection devices 100 may be used at a meeting each having different display portions 125 but all responding to the same piece of content in a meeting. As opposed to oral feedback collection, by using multiple feedback collection devices 100 feedback may be collected about multiple evaluands from different participants simultaneously thus providing a more time efficient feedback process.

According to a further embodiment, the feedback collection device 100 may also be used to collect feedback outside of a meeting. In this embodiment, the feedback collection device 100 may be setup in a space over a period of time allowing participants to provide evaluands, for example ideas, and to rate and comment on them at their convenience.

Beyond rating or providing feedback about an evaluand, embodiments of the invention may also be used for: voting, such as for people, where the token is used to vote for your preferred candidate; conducting a poll or survey, where a token is used to select the term that best matches the person's answer; group testing, where a token is used to denote the correct answer; and participatory budgeting, where a person could deposit one or more tokens in the spending options that he or she believes the group or organization should direct their funds towards.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description and all changes which come within the meaning and range of equivalency of the claims are therefore intended to be embraced therein.

What is claimed is:

1. A feedback collection system for collecting feedback from a group of people, the system comprising:
    two or more tokens;
    a response collector including a display portion, the display portion having a visible surface displaying two or more selections for user responses and a token collection portion, the token collection portion have two or more receptacles dimensioned to receive the tokens, each token then stored in the receptacle in a substantially vertical position and positioned such that each receptacle is associated with one of the selections, the token collection portion being at least partially translucent such that all the tokens are equally visible within the token collection portion; and
    a removable screen for removably covering the token collection portion such that the removable screen abuts the token collection portion and substantially conceals the token collection portion from view of the group of people.

2. The feedback collection system of claim 1, wherein the removable screen further comprises instructions displayed to the group of people on how to provide feedback using the system.

3. The feedback collection system of claim 2, wherein the removable screen further comprising a medium fastener for removably securing a first medium, the first medium indicating thereon an evaluand about which feedback from the group of people is being collected.

4. The feedback collection system of claim 3, wherein the first medium further comprises a section for receiving written comments about the evaluand.

5. The feedback collection system of claim 3, wherein the first medium comprises one of: paper, laminated paper, and dry-erase surface material.

6. The feedback collection system of claim 1, wherein the display portion extends into the receptacles such that selections for user responses are visible with the receptacles.

7. The feedback collection system of claim 6, wherein the display portion further comprises graduation markers to help count the number of tokens associated with an item representing a person's rating for an evaluand.

8. The feedback collection system of claim 7, wherein the display portion is comprised of one of: paper, laminated paper and dry-erase material.

9. The feedback collection system of claim 1, further comprising an adjustable stand for supporting the response collector in an inclined or vertical position.

10. The feedback collection system of claim 1, wherein the two or more tokens are of substantially identical size, shape, and color.

11. The feedback collection system of claim 1, wherein the two or more tokens are provided in two or more groups, each group being substantially identical in size, shape and color.

12. The feedback collection system of claim 1, wherein the receptacles further comprise a retention member to inhibit tokens from escaping the receptacle after collection.

13. The feedback collection system of claim 1, further including one or more universal connection components attached to the response collector.

14. The feedback collection system of claim 1, further comprising a releasable fastener for removably attaching the removable screen to the response collector.

15. A method for collecting feedback from a group of people, the method comprising:
    providing two or more tokens to the group of people;
    providing a first medium indicating an evaluand about which feedback from the group of people is being collected;
    providing a feedback collection device, comprising:
        a response collector including a display portion, the display portion having a visible surface displaying two or more selections for user responses and a token collection portion, the token collection portion have two or more receptacles dimensioned to receive the tokens, each token then stored in the receptacle in a substantially vertical position and positioned such that each receptacle is associated with one of the selections, the token collection portion being at least partially translucent such that the tokens are visible within the token collection portion; and a removable screen for removably covering the token collection portion such that the removable screen abuts the token collection portion and substantially conceals the token collection portion from view of the group of people; and receiving, from each of two or more people from the group of people, one of the tokens into the token collection portion of the response collector in a manner associating the respective token with that person's rating of the evaluand.

16. The method of claim 15, further comprising moving the removable screen from substantially concealing the token collection portion of the response collector.

17. The method of claim 16, further comprising summing the number of tokens associated with each item representing a person's rating for the evaluand.

18. The method of claim 15, wherein the first medium further comprises a defined location for receiving written comments about the evaluand.

19. The method of claim 18, wherein at least one of the group of people provides written comments about the evaluand.

20. The method of claim 18, wherein the two or more people from the group sign the first medium after depositing a token into the token collection portion of the response collector.

21. The method of claim 15, wherein the feedback collection device further comprises a releasable fastener for removably attaching the removeable screen to the response collector.

22. A kit for assembling a feedback collection system, the kit comprising:

one or more first mediums for indicating an evaluand about which feedback from a group of people is being collected;

two or more tokens for use by the group of people;

a response collector including a display portion, the display portion having a visible surface displaying two or more selections for user responses and a token collection portion, the token collection portion have two or more receptacles dimensioned to receive the tokens, each token then stored in the receptacle in a substantially vertical position and positioned such that each receptacle is associated with one of the selections, the token collection portion being at least partially translucent such that the tokens are visible within the token collection portion;

one or more second mediums for application to the display portion and providing variations for the two or more selections for user responses; and a removable screen for removably covering the token collection portion such that the removable screen abuts the token collection portion and substantially conceals the token collection portion from view of the group of people.

23. The kit of claim 22, wherein the two or more tokens are of substantially identical size, shape and color.

24. The kit of claim 22, wherein the two or more tokens are provided in two or more groups, each group of substantially identical size, shape and color.

25. The kit of claim 22, further comprising:

a releasable fastener for removably attaching the removable screen to the response collector; and an adjustable stand for supporting the response collector in an inclined or vertical position.

\* \* \* \* \*